(12) United States Patent
Jeong et al.

(10) Patent No.: US 11,010,967 B2
(45) Date of Patent: May 18, 2021

(54) THREE DIMENSIONAL CONTENT GENERATING APPARATUS AND THREE DIMENSIONAL CONTENT GENERATING METHOD THEREOF

(71) Applicant: SAMSUNG ELECTRONICS CO., LTD., Suwon-si (KR)

(72) Inventors: Jae-yun Jeong, Seongnam-si (KR); Alexander Limonov, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/352,064

(22) Filed: Mar. 13, 2019

(65) Prior Publication Data
US 2019/0213786 A1 Jul. 11, 2019

Related U.S. Application Data

(63) Continuation of application No. 15/185,896, filed on Jun. 17, 2016, now Pat. No. 10,269,175.

(30) Foreign Application Priority Data

Jul. 14, 2015 (KR) .................. 10-2015-0100077

(51) Int. Cl.
*G06T 15/04* (2011.01)
*G06T 15/20* (2011.01)
(Continued)

(52) U.S. Cl.
CPC .......... *G06T 17/10* (2013.01); *G06K 9/00208* (2013.01); *G06K 9/00268* (2013.01);
(Continued)

(58) Field of Classification Search
CPC .......... G06K 9/00208; G06K 9/00268; G06K 9/00288; G06T 2207/20081; G06T 7/251; G06T 7/75
See application file for complete search history.

(56) References Cited

U.S. PATENT DOCUMENTS 6,757,571 B1 * 6/2004 Toyama ................. G06N 20/00
700/47
7,835,568 B2 11/2010 Park et al.
(Continued)

FOREIGN PATENT DOCUMENTS

| CN | 1797474 A | 7/2006 |
|---|---|---|
| CN | 1870759 A | 11/2006 |

(Continued)

OTHER PUBLICATIONS

Communication dated May 24, 2018 by the European Patent Office in counterpart European Patent Application No. 16824612.2.
(Continued)

*Primary Examiner* — Kenny A Cese
(74) *Attorney, Agent, or Firm* — Sughrue Mion, PLLC

(57) ABSTRACT

A three dimensional (3D) content generating apparatus includes an inputter configured to receive a plurality of images of an object captured from different locations; a detector configured to identify the object and detect a predetermined feature point of the object from each of the plurality of images; a map former configured to extract 3D location information of the detected feature point, and configured to form at least one depth map with respect to a surface of the object based on the extracted 3D location information of the feature point; and a content generator configured to generate a 3D content of the object using the at least one depth map and the plurality of images.

12 Claims, 12 Drawing Sheets

Input images

3D Face model

(51) Int. Cl.
  *G06K 9/00*  (2006.01)
  *G06T 7/73*  (2017.01)
  *G06T 7/55*  (2017.01)
  *G06T 17/10*  (2006.01)

(52) U.S. Cl.
  CPC .................. *G06T 7/55* (2017.01); *G06T 7/74* (2017.01); *G06T 15/04* (2013.01); *G06T 15/205* (2013.01); *G06T 2207/30201* (2013.01); *G06T 2207/30244* (2013.01)

(56) References Cited

U.S. PATENT DOCUMENTS

| | | | |
|---|---|---|---|
| 7,952,606 | B2 | 5/2011 | Kweon et al. |
| 8,374,422 | B2 | 2/2013 | Roussel |
| 9,053,562 | B1 | 6/2015 | Rabin et al. |
| 9,465,444 | B1 | 10/2016 | Ramaswamy |
| 2003/0038801 | A1 | 2/2003 | Terauchi |
| 2005/0063582 | A1 | 3/2005 | Park et al. |
| 2006/0268103 | A1 | 11/2006 | Kweon et al. |
| 2007/0247473 | A1 | 10/2007 | Li |
| 2010/0201682 | A1* | 8/2010 | Quan .................. G06T 15/04 345/419 |
| 2010/0295854 | A1 | 11/2010 | Miller |
| 2012/0133746 | A1 | 5/2012 | Bigioi et al. |
| 2013/0127988 | A1 | 5/2013 | Wang |
| 2013/0300740 | A1* | 11/2013 | Snyder .................. G06F 3/016 345/420 |
| 2014/0029837 | A1 | 1/2014 | Venkatraman et al. |
| 2014/0043329 | A1 | 2/2014 | Wang et al. |
| 2014/0112573 | A1 | 4/2014 | Francis, Jr. et al. |
| 2014/0314290 | A1 | 10/2014 | Dabbah et al. |
| 2015/0009207 | A1* | 1/2015 | Guo .................. G06T 15/00 345/419 |
| 2015/0035825 | A1 | 2/2015 | Zhou et al. |
| 2015/0049169 | A1* | 2/2015 | Krig .................. H04N 13/211 348/46 |
| 2015/0055085 | A1 | 6/2015 | Fonte |
| 2015/0381968 | A1 | 12/2015 | Arora |
| 2016/0065903 | A1* | 3/2016 | Wang .................. B60R 11/04 348/148 |
| 2016/0196665 | A1 | 7/2016 | Abreu |
| 2016/0259993 | A1 | 9/2016 | Ulbricht |

FOREIGN PATENT DOCUMENTS

| | | |
|---|---|---|
| CN | 103201772 A | 7/2013 |
| CN | 103430218 A | 12/2013 |
| CN | 103761766 A | 4/2014 |
| EP | 2851868 A1 | 3/2015 |
| JP | 2005056175 A | 3/2005 |
| JP | 2005317000 A | 11/2005 |
| KR | 10-2005-0022306 A | 3/2005 |
| KR | 1020090092473 A | 9/2009 |
| KR | 1020120121034 A | 11/2012 |
| KR | 10-2014-0137564 A | 12/2014 |
| WO | 02/073540 A1 | 9/2002 |
| WO | 2012/028866 A1 | 3/2012 |
| WO | 2012/126135 A1 | 9/2012 |
| WO | 2015051827 A1 | 4/2015 |

OTHER PUBLICATIONS

Kamencay et al: "2D-3D Face Recognition Method Based on a Modified CCA-PCA Algorithm", International Journal of Advanced Robotic Systems, Oct. 3, 013, pp. 1-8, University of Zilina, Zilina, Slovakia, 8 pages total.

Baumberg Adam, "Blending images for texturing 3D models"; BMVC 2002, Canon Research Centre Europe, pp. 404-413, Berkshire, UK, 10 pages total.

Tanskanen et al; "Live Metric 3D Reconstruction on Mobile Phones"; Dec. 1-8, 2013, ETH Zurich, Switzerland, 39 pages total.

Search Report dated Sep. 29, 2016 issued by the International Searching Authority in counterpart International Application No. PCT/KR2016/006549 (PCT/ISA/210).

Written Opinion dated Sep. 29, 2016 issued by the International Searching Authority in counterpart International Application No. PCT/KR2016/006549 (PCT/ISA/237).

Communication dated Jun. 5, 2019, issued by the Korean Intellectual Property Office in counterpart Korean Application No. 10-2015-0100077.

Communication dated Sep. 4, 2019 issued by the State Intellectual Property Office of P.R. China in counterpart Chinese Application No. 201680041402.3.

Communication dated Apr. 3, 2020, issued by the State Intellectual Property Office of P.R. China in counterpart Chinese Application No. 201680041402.3.

Communication dated Aug. 12, 2020, from the European Patent Office in counterpart European Application No. 16824612.2.

Communication dated Oct. 21, 2020, issued by the State Intellectual Property Office of P.R. China in counterpart Chinese Application No. 201680041402.3.

Communication dated Mar. 1, 2021, issued by the State Intellectual Property Office of P.R. China in counterpart Chinese Application No. 201680041402.3.

* cited by examiner

Unblended area - Φ

62

THREE DIMENSIONAL CONTENT GENERATING APPARATUS AND THREE DIMENSIONAL CONTENT GENERATING METHOD THEREOF

CROSS-REFERENCE TO RELATED APPLICATION

This application is a continuation of U.S. application Ser. No. 15/185,896 filed Jun. 17, 2016, claims priority from Korean Patent Application No. 10-2015-0100077, filed on Jul. 14, 2015, in the Korean Intellectual Property Office, the disclosure of which is incorporated herein in its entirety by reference.

BACKGROUND

Field

Apparatuses and methods consistent with exemplary embodiments relate to a three dimensional (3D) content generating apparatus and a three dimensional content generating method thereof, and more particularly, to a three dimensional content generating apparatus configured to generate three dimensional contents based on detection of feature point of an object and a three dimensional content generating method thereof.

Description of the Related Art

Recently, much research has been conducted to detect and recognize a face of an object in a video image. Recognizing a face which has a three dimensional (3D) shape from a two dimensional (2D) image is very important in various technology fields such as face recognition, facial expression recognition, image modeling and the like. However, it is very difficult to recognize a three dimensional face shape from a two dimensional image because the two dimensional image does not include depth information of an object.

Various methods may be used to perform 3D face modeling. For example, a red, green, and blue (RGB) image and a depth map may be obtained using a 3D camera. However, since 3D cameras are very expensive, a stereo matching method using 2D cameras are widely used. Nonetheless, the stereo matching method has limitations in that at least two 2D cameras are required.

In addition, restoring a face is much more difficult than restoring other areas of an object. This is because a color distribution of the face is substantially homogeneous, there are not enough feature points, and a facial expression of an object may change when an image of the object is obtained.

Therefore, a technology capable of stably restoring a 3D facial image without requiring a plurality of 2D cameras or without requiring a 3D camera is desirable.

SUMMARY

One or more exemplary embodiments provide a three dimensional (3D) content generating apparatus that generates three dimensional contents based on detecting feature points of an object, and a three dimensional content generating method thereof.

According to an aspect of an exemplary embodiment, provided is a three dimensional (3D) content generating apparatus including: an inputter configured to receive a plurality of images of an object, the plurality of images being captured from different locations; a detector configured to identify the object and detect a feature point of the object from each of the plurality of images; a map former configured to extract 3D location information of the detected feature point, and configured to form at least one depth map with respect to a surface of the object based on the extracted 3D location information of the feature point; and a content generator configured to generate a 3D content of the object based on the at least one depth map and the plurality of images.

The apparatus may further include a location determiner configured to determine a capturing location, from which each of the plurality of images is captured, based on the extracted 3D location information of the feature point of the object, wherein the content generator is configured to generate the 3D content of the object based on the determined capturing location.

The detector may apply a learned model of the object to the plurality of images and detect the feature point of the object.

The detector may update the model of the object by using at least one of the plurality of images, the determined capturing location, and the detected feature point, and may detect the feature point by applying the updated model to an image subsequently input.

The content generator may select an image, from among the plurality of images, based on at least one of an arrangement shape of the detected feature point and the determined capturing location, and may restore, by using the selected image, a texture of at least one predetermined part of the object, to generate the 3D content.

The content generator may select at least two images, from among the plurality of images, based on the at least one of the arrangement shape of the detected feature point and the determined capturing location, and may restore, by using the at least two selected images, a texture of a part other than the predetermined part, to generate the 3D content.

The object may include a head of a human, and the detector may apply a learned facial model of a human to the plurality of images and detect the facial feature point.

The detector may update the facial model by using at least one of the plurality of images, the determined capturing location, and the detected facial feature point, and may detect the facial feature point by applying the updated facial model to an image subsequently input.

The content generator may select an image, from among the plurality of images, based on at least one of an arrangement shape of the detected facial feature point and the determined capturing location, and may restore, by using the selected image, a texture of at least one of an area corresponding to an eyebrow, an area corresponding to an eye, an area corresponding to a nose, and an area corresponding to a mouth, to generate the 3D content.

The content generator may select at least two images, from among the plurality of images, based on the at least one of the arrangement shape of the detected facial feature point and the determined capturing location, and restore, by using the at least two selected images, a texture of an area other than the area corresponding to the eyebrow, the area corresponding to the eye, the area corresponding to the nose, and the area corresponding to the mouth, to generate the 3D content.

The map former may select an image, from among the plurality of images, based on at least one of a distribution of the detected feature point and the determined capturing location, and form the depth map based on depth information extracted from the selected image, and the content generator may determine a volume of a voxel cube (the volume of the voxel is equal to or greater than the object), rotate the voxel cube based on the learned model of the object, and apply a higher resolution to at least one predetermined part of the object than to a part other than the predetermined part.

The map former may form the depth map through stereo processing between at least two images among the plurality of images, and determine a size of a patch for the stereo processing based on at least one of the 3D location information of the feature point detected from the at least two images and capturing locations from which the at least two images are captured.

The map former may determine a depth range with respect to the surface of the object based on the 3D location information of the feature point, and form the depth map based on the determined depth range.

The content generator may determine a volume of the object based on the 3D location information of the feature point, and generate the 3D content based on the determined volume.

The plurality of images may be obtained by capturing the object by using a monocular camera at the different locations.

According to an aspect of another exemplary embodiment, provided is a 3D content generating method including: receiving an input of a plurality of images of an object, the plurality of images being captured from different locations; identifying the object and detecting a feature point of the object from each of the plurality of images; extracting 3D location information of the detected feature point, and forming at least one depth map with respect to a surface of the object based on the extracted 3D location information of the feature point; and generating a 3D content of the object based on the at least one depth map and the plurality of images.

The method may further include determining a capturing location, from which each of the plurality of images is captured, based on the 3D location information of the feature point, wherein the generating includes generating the 3D content of the object based on the determined capturing location.

The detecting may include applying a learned model of the object to the plurality of images to detect the feature point of the object.

The detecting may include updating the model of the object by using at least one of the plurality of images, the determined capturing location, and the detected feature point, and detecting the feature point by applying the updated model to an image subsequently input.

The generating may include selecting an image, from among the plurality of images, based on at least one of an arrangement shape of the detected feature point and the determined capturing location, and restoring, by using the selected image, a texture of at least one predetermined part of the object.

The generating may include selecting at least two images, from among the plurality of images, based on the at least one of the arrangement shape of the detected feature point and the determined capturing location, and restoring, by using the at least two selected images, a texture of a part other than the predetermined part.

The object may include a head of a human, and the detecting may include applying a learned facial model of a human to the plurality of images to detect the facial feature point.

The detecting may include updating the facial model by using at least one of the plurality of images, the determined capturing location, and the detected facial feature point; and detecting the facial feature point by applying the updated facial model to an image subsequently input.

The generating may include selecting an image, from among the plurality of images, based on at least one of an arrangement shape of the detected facial feature point and the determined capturing location, and restoring, by using the selected image, a texture of at least one of an area corresponding to an eyebrow, an area corresponding to an eye, an area corresponding to a nose, and an area corresponding to a mouth, to generate the 3D content.

The generating may include selecting at least two images, from among the plurality of images, based on the at least one of the arrangement shape of the detected facial feature point and the determined capturing location, and restoring, by using the at least two selected images, a texture of an area other than the area corresponding to the eyebrow, the area corresponding to the eye, the area corresponding to the nose, and the area corresponding to the mouth, to generate the 3D content.

The forming the depth map may include selecting an image, from among the plurality of images, based on at least one of a distribution of the detected feature point and the determined capturing location; forming the depth map based on depth information extracted from the selected image; determining a volume of a voxel cube, the volume being equal to or greater than the object; rotating the voxel cube based on a learned model of the object; and applying a higher resolution to at least one predetermined part of the object than to a part other than the predetermined part.

The forming the depth map may include forming the depth map through stereo processing between at least two images among the plurality of images, and determining a size of a patch for the stereo processing based on at least one of the 3D location information of the feature point detected from the at least two images and capturing locations from which the at least two images are captured.

According to an aspect of still another exemplary embodiment, provided is a non-transitory record medium that stores a program which, when executed by a computer, causes the computer to execute a 3D content producing method, the 3D content generating method including: receiving an input of a plurality of images of an object, the plurality of images being captured from different locations; identifying the object and detecting a feature point from each of the plurality of images; extracting 3D location information of the detected feature point, and forming at least one depth map with respect to a surface of the object based on the extracted 3D location information of the feature point; and generating a 3D content of the object based on the at least one depth map and the plurality of images.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
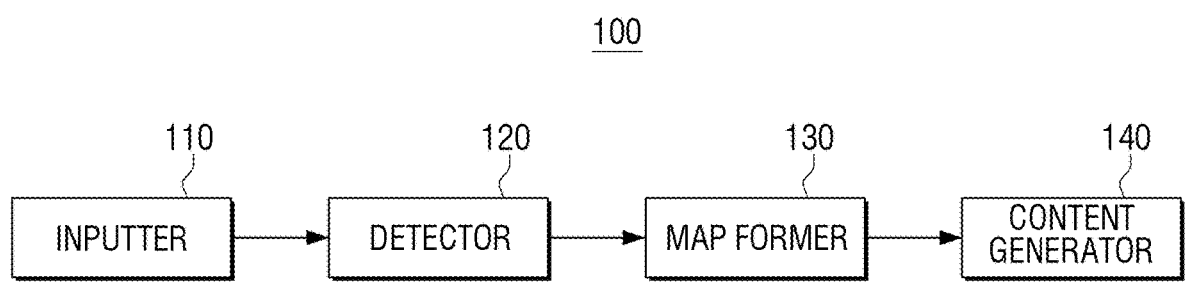
FIG. 1 is a block diagram illustrating a three dimensional content generating apparatus according to an exemplary embodiment.

Hereinafter, the exemplary embodiments are described in greater detail with reference to the accompanying drawings.

In the following description, unless otherwise described, the same reference numerals are used for the same elements when they are depicted in different drawings. The matters defined in the description, such as detailed construction and elements, are provided to assist in a comprehensive understanding of the exemplary embodiments. Thus, it is understood that the exemplary embodiments can be carried out without those specifically defined matters. Also, functions or elements known in the related art are not described in detail since they would obscure the exemplary embodiments with unnecessary detail.

The terms "first", "second", . . . may be used to describe diverse components, but the components should not be limited by the terms. The terms are only used to distinguish one component from the others.

The terms used herein are only used to describe the exemplary embodiments, but are not intended to limit the scope of the disclosure. The singular expression also includes the plural meaning as long as it does not differently mean in the context. In the specification, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment, a "module" or a "unit" performs at least one function or operation, and may be implemented in hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

FIG. 1 is a block diagram for explaining a configuration of a three dimensional (3D) content generating apparatus according to an exemplary embodiment.

Referring to FIG. 1, a three dimensional content generating apparatus 100 includes an inputter 110, a detector 120, a map former 130, and a content generator 140. The three dimensional content generating apparatus 100 may be realized as various apparatuses such as a smart phone, a television (TV), a notebook personal computer (PC), a tablet PC, an e-book, an electronic picture frame, a kiosk and the like.

The inputter 110 receives a plurality of images of an object captured from different locations. Herein, the plurality of images may include a still image (or a frame) of an object and may constitute a video.

The inputter 110 may be realized as a camera or a communication interface that receives an image captured from an external camera.

In the case where the inputter 110 is realized as a communication interface, the inputter 110 may include various communication chips such as a wireless fidelity (Wi-Fi) chip, a Bluetooth chip, a near field communication (NFC) chip, a wireless communication chip and the like. The Wi-Fi chip, the Bluetooth chip, the NFC chip may be used to perform communication using a Wi-Fi method, a Bluetooth method, and an NFC method, respectively. The NFC chip refers to a chip that is used to perform NFC communication by using a 13.56 MHz band from among various frequency bands of radio frequency identification (RFID) such as 135 kHz, 13.56 MHz, 433 MHz, 860-960 MHz, and 2.45 GHz. In the case of using a Wi-Fi chip or Bluetooth chip, various connection information such as a service set identifier (SSID), a session key and the like may be transmitted and/or received first, and then various information may be transmitted and/or received by using the connection information. The wireless communication chip refers to a chip that performs communication according to various communication standards such as an Institute of Electrical and Electronics Engineering (IEEE), a zigbee, a third generation (3G), a third generation partnership project (3GPP), a long term evolution (LTE), and the like.

In the case where the inputter 110 is realized as a camera, the inputter 110 may include a lens and an image sensor. Types of the lens may include a general use lens, an optical angle lens, a zoom lens and the like. The type of the lens of a camera may be determined according to the type, characteristics, use environment and the like of the 3D content generating apparatus 100. Examples of the image sensor of a camera may include a complementary metal oxide semiconductor (CMOS), a charge coupled device (CCD) and the like.

In an exemplary embodiment, a 3D content may be generated through a two dimensional (2D) image obtained through a monocular camera. That is, according to an exemplary embodiment, a need for a plurality of cameras is obviated. Therefore, the 3D content generating apparatus 100 may be realized as an apparatus (e.g., a smart phone) in which a monocular camera is embedded.

The detector 120 may identify an object based on at least one of a plurality of images which photograph an object. For example, the detector 120 may identify an object by extracting an area which corresponds to an object from at least one image from among a plurality of images and comparing the extracted area with the prestored information on object. For example, the detector may identify that an object included in an image is the face of a human by comparing an area corresponding to the object extracted from the image and prestored information on the face of a human. For identifying an object within an image, various conventional methods can be used. Therefore, detailed explanation will be omitted. The detector 120 may detect a predetermined feature point of the object from each of the plurality of images that are input through the inputter 110.

To be specific, the detector 120 may extract feature points which are specific to an object according to an identified object.

For example, a point, even if a shape, size, location of an object changes, which can be easily identified, and a point, even if a viewpoint of a camera and lighting change, which can be easily found from an image can be decided as a feature point.

The detector 120 may apply a learned model of the object to the plurality of images and detect the feature point. The learned model of the object indicates a result of repeating the operations that a plurality of images (for example, when an object is hands of a human, images photographing hands of various humans) regarding the object are input, preset feature points are selected manually or automatically from each image, and information on the selected feature points is input, with reference to a plurality of images.

When it is assumed that a plurality of images correspond to images of a person's head, the detector 120 may detect a facial feature point of each of the images.

The detector 120 may apply a facial model, which is learned with respect to a face of a person, to a plurality of images input through the inputter 110 and detect a facial feature point. A facial feature point refers to a feature point of a face such as, for example, a feature point regarding an eye, an eyebrow, a nose, an upper lip, a lower lip, a jaw line, or the like. The facial model that is learned with respect to a face of a person may be obtained as a result of inputting an image, which is obtained by capturing the face of the person, manually or automatically determining a feature point regarding an eye, an eyebrow, a nose, an upper lip, a lower lip, a jaw line, or the like from each image, and inputting respective information on a facial area representing the determined feature point with respect to each of a plurality of images. The above process may be performed by using a machine learning technology, which is well known to those skilled in the related art, and thus detailed explanation thereof will be omitted.

A learned facial model may include information that can be extracted from an image of the face used in the learning, that is, 3D information and color information of a facial feature based on a location of a facial feature point, information on color of a captured image, information on texture of the captured image, information on a location from which an object is captured (or information on a location of a camera) and the like.

The detector 120 may automatically detect a facial feature point from an image through various algorithms of a learned facial model. For example, algorithms such as active appearance models (AAMs) or active shape models (ASMs) may be used.

The ASM is a model to detect a location of an eye, and determine, by using shape information, a location of other areas, for example, a nose, a mouth, an eyebrow, and the like based on the detected location of the eye. And the AAM is a model to detect a facial feature point capable of efficiently explaining a facial feature not only based on the shape information but also based on texture information.

The AAM performs warping on a standard facial model, which is provided based on statistics of faces of various people, by applying a principal component, analysis (PCA) to a facial model vector and a facial surface texture, to minimize an error square of a standardized face data and a normalized 2D face data. Using the standardized face data and the normalized 2D face data, a facial feature point is found in the AAM. The AAM has an advantage in that the AAM may provide a fast calculation speed and a tracking feature.

In the case of using the AAM, the detector 120 may perform a fitting operation of detecting a feature point regarding an eye, an eyebrow, a nose, an upper lip, a lower lip, and/or a jawline of a face included in an input image.

In this case, the fitting may be performed to minimize or reduce a cost function that is expressed by Equation 1 below.

$$E_F = E_{2D}(p,q) + \alpha \cdot E_{tx}(p,q) + \beta \cdot E_{3D}(p,q,K,P,X).$$ [Equation 1]

Herein, $E_F$ is the cost function, and $E_{2D}$ is a difference between a 2D average model of a captured facial image and a warped appearance thereof. Shape parameters p and q are used. $E_{tx}$ is a difference between a texture of the captured image and a warped template facial texture of a selected image, which is referred to as a key frame. Detailed discussion of the key frame will be provided later. $\alpha$ is a weighted value of $E_{tx}$. In addition, $E_{3D}$ is a geometric difference between a 2D shape and a shape X of a reference 3D facial model projected on a 2D plane, wherein intrinsic parameters K regarding a camera that captures the facial image and an external parameter P are used. $\beta$ is a weighted value of $E_{3D}$.

The detector 120 may update a facial model based on the facial feature point and also based on a capturing location of one or more images corresponding to feature points, and may apply the updated facial model to images that are subsequently input. Therefore, since a feature of the object that is currently being captured may be reflected on a facial model to be applied to subsequent images by machine learning, the precision of detecting a feature point may be improved.

Herein, the updated facial information may include not only location and color information of a 2D or 3D point of a learned facial model, but the updated facial information may further include information on a 3D point, a mesh location, a size and a color generated based on information of locations of a plurality of captured images previously obtained, information of color of the plurality of captured images previously obtained, and information of texture of the plurality of images previously obtained.

Figure 2:
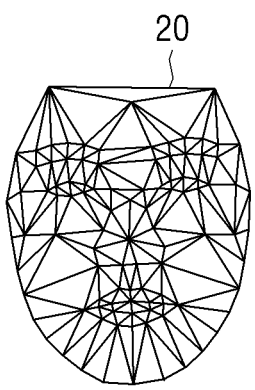
FIG. 2 is a view for explaining a facial mesh configured according to an exemplary embodiment.

FIG. 2 is a view for explaining a facial mesh configured according to an exemplary embodiment. Referring to FIG. 2, the detector 120 may configure a face mesh 20 including a mesh triangle of detected feature points connected as illustrated in FIG. 2. Based on the face mesh 20, the detector 120 may identify an angle and a size of a face within the captured image.

More specifically, the external parameter P in Equation 1 may include information on an angle of the face, and a size of the face mesh triangle or a value of the external parameter P contains information on the size of the face.

More specifically, the detector 120 may obtain a size area of a left side and a size area of a right side of the face using a location of a feature point. Herein, the detector 120 obtains the size area of the right side of the face and a size area of the right side of the face using a location of a feature point located in a middle of a forehead, a location of a feature representing an outline of the face, a location of a feature point corresponding to an end portion of a nose, and locations of representative feature points such as locations of features surrounding a lip area.

More specifically, the detector 120 may determine a mesh triangle based on a location of representative feature points, and calculate a sum of a size area of the mesh triangle to obtain the size area of the left side and the size area of the right side of the face. Then, the detector 120 may detect information of an angle of the face from a ratio of the size area of the left side of the face and the size area of the right area of the face.

In this manner, the detector 120 may detect information on the angle of the face in a yaw, a pitch and a roll directions. The information on the angle of the face in the roll, pitch and yaw directions may correspond to a rotation angle relative to x, y, and z axes.

Furthermore, the 3D content generating apparatus 100 may further include a location determiner (not illustrated) that determines a location of the camera (i.e. camera pose) that captures each image.

The location determiner may determine the location of the camera that captures the image based on the angle and size of the face calculated through the face mesh, a distribution of 3D feature points, and the 2D location captured into the image.

In another exemplary embodiment, the 3D content generating apparatus 100 may form a 3D point cloud in a stereo vision method that uses a monocular camera, and determine the location of the camera.

More specifically, the location determiner may use a stereo matching processing method that uses two images to detect a corresponding portion between the two images, thereby determining a relative location of the camera with respect to each image to determine the location of the camera.

More specifically, the location determiner may determine an absolute location of each camera by comparing and analyzing a 2D location of a feature point of the captured image and a 3D location of a feature point that has been registered, thereby determining the location of the camera.

Herein, the feature point refers to a point that may correspond to a feature of the image. Not only a previously learned facial feature point but also any point added through the stereo processing may be used as the feature point.

However, when a method of determining a camera location based on comparison of detected feature points is used with respect to an object having a homogeneous color distribution such as a face, an error of perceiving different feature points as the same feature point may occur due to the similarity of color of the object. For example, in a case where only a right side of a face can be seen and a left side of the face cannot be seen from a first image, and only the left side of the face can be seen and the right side of the face cannot be seen from a second image, an error of determining a common feature point between the images may occur according to the color similarity of the two images.

Therefore, in an exemplary embodiment, to reduce this error, feature points from different images that are predicted as not a common feature point are excluded, and thus only valid feature points may be extracted.

More specifically, among the feature points registered in the 3D point cloud, only the valid feature points that are not covered with the face mesh generated by the detector 120 as mentioned above are extracted. The valid feature points are feature points from which an outlier has been removed, and thus by using the feature points, it is possible to determine the location of the camera with higher precision and substantially without an error.

Thus, according to an exemplary embodiment, the location of the camera may be determined with higher precision by using a facial model in which a 2D technology of extracting the feature points is combined with a 3D tracking technology.

The location P* of the camera may be finally determined by Equation 2 below according to an exemplary embodiment.

$$P^* = \arg\min_{P} \left( \sum_{i \in X} RE(i, P) + \lambda \cdot \sum_{j \in X'} RE(j, P) \right) \quad \text{[Equation 2]}$$

Herein, P* is the final camera location, and RE(i, P) is a re-projection error of point i using the camera location P. Furthermore, RE(j, P) is a re-projection error of point j using the camera location P. Furthermore, section error on 2 below according to an exemplary embodiment.er precision' is a key point outside the face or a key point that is within the face but the key point X' is generated through stereo processing and not through learning. Both X and X' are updated through bundle adjustment. Furthermore, any key point X or X' is temporarily removed in the process of determining the location of the camera that captures the image as an outlier when the key point is covered with a sparse mesh (M).

As aforementioned, the location determiner may determine the location of the camera with higher precision based on the 3D tracking technology using the valid feature points from which the outlier has been removed. As aforementioned, the content generator 140 may generate a 3D content regarding the object based on the determined location of the camera.

It is possible to remove the feature points having low reliability due to large re-projection errors, and correct the locations of feature points having large errors through a high precision matching algorithm, thereby determining the 3D point cloud information.

The process of determining valid feature points may be repeated to reflect the 3D point cloud information that is updated as described above, the information of the facial model used in machine learning can also be updated. Therefore, since the features of the captured object are reflected in the model, the precision of machine learning may be improved.

In other words, the detector 120 may update the facial model using at least one of a plurality of input images, locations of capturing the images, and feature points detected from the images, and then after the updating, the detector 120 may apply the updated facial model to the images being input through the inputter 110 thereby repeatedly detect the facial feature points.

The facial model updated in this manner reflects not only the information on the initially provided facial model but also the information on the object that is currently being captured. In other words, the updated facial model may include not only information on locations and color of 2D or 3D points of the learned facial model but also information on locations and color of 3D points further generated based on information on a plurality of captured images previously obtained, information on colors of the plurality of captured images previously obtained, and information on texture of the plurality of captured images previously obtained.

Therefore, the updated facial model may reflect in real time the features of the object currently being captured, and therefore, the precision of detecting facial feature points of an object being captured may be improved.

The map former 130 forms a depth map of a surface of an object. The depth map refers to a collection of depth information representing 3D distance information of an object and a background in an image.

The map former 130 may extract 3D location information of a facial feature point that is detected by applying a learned facial model based on 3D location information of the facial model. Furthermore, the map former 130 may form a depth map of a surface of an object based on the extracted 3D location information of a feature point. The 3D location information of a feature point extracted by the map former 130 is based on a face of a person, and thus 3D location information may not reflect the exact information of the actual object that is being captured. However, based on a fact that an end of a nose protrudes more than other parts of a face, the map former 130 may extract a rough 3D location information of the object being captured based on the facial model. Therefore, based on the 3D location information, it is possible to define a range of locations of actual points that form the surface of the object existing in a 3D space, and thus it is possible to form a depth map with precision and at a faster speed than when determining each location of a point one by one without using a defined area.

Furthermore, the map former 130 may select an image to extract depth information, among the plurality of images input through the inputter 110, and form a depth map by using the selected image and depth information extracted from the selected image. The selected image is called a key frame, and an unselected image is called a reference frame. In this case, among a plurality of sequentially input images, the map former 130 may select images at predetermined interval as the key frame.

In another exemplary embodiment, the map former 130 may select the key frame based on the distribution of facial feature points detected in the detector 120, a relationship between an image and facial feature points detected from the image, and relative capturing locations between the images.

More specifically, according to the facial feature points detected in the detector 120, it is possible to identify which part of a head is included in an image and the map former 130 may select, as a key frame, images corresponding to a front surface of the face at every predetermined first interval, and select, as a key frame, images corresponding to other parts at every second interval that is greater than the predetermined first interval. In this manner, a greater number of key frames may be obtained with respect to a facial area that needs to be expressed more exactly, and a smaller number of key frames may be obtained with respect to a facial area such as a back part of a head that does not need to be expressed exactly. Therefore, it is possible to increase the precision of restoring a shape with respect to a face area of importance while reducing a speed in forming a depth map.

In another exemplary embodiment, the map former 130 may determine a quality of map information formed while forming the map information, and when it is determined that the quality is below a predetermined standard, it is possible to select more key frames in the corresponding area and form map information based thereon again.

Furthermore, the map former 130 may form a depth map through stereo processing based on comparison and analysis of a selected key frame and a reference frame.

The stereo processing refers to processing of distance information between images obtained from different locations, similarly to a visual system of a human being. Stereo processing (or stereo combining) is one of computer visual areas that simulates a capability of extracting a distance between images in for a human visual system. More specifically, various methods such as a template matching, a voxel based multi-view method and the like may be used, which are well known to those skilled in the related art and thus detailed explanation thereof will be omitted.

In this case, in an exemplary embodiment, the map former 130 may determine a depth range of a surface of an object based on at least one of 3D location information of extracted feature points and a facial mesh (or volume model) configured by connecting the feature points (or points), and form a depth map within the determined depth range. More specifically, the map former 130 may reflect the facial model in the camera location of the current key frame, and predict an initial depth range of each pixel within the key frame. Therefore, it is possible to improve the precision of extracting depth information for each pixel.

Furthermore, the map former 130 may determine a size of a patch (or a patch size) for stereo processing based on the 3D location information of the extracted feature point. In the case of using the template matching method, the patch size for template matching may be determined.

In this case, the map former 130 may determine the patch size based on the 3D location information of the feature point extracted from at least two or more images, relative capturing locations between the at least two or more images, and the distribution of feature points in the at least two or more images.

More specifically, the map former 130 may reflect the facial model in the location of the camera of the current key frame, determine a geographical similarity between pixels of the key frame based on the reflected information, and determine the patch size based on the color similarity between the key frame pixel and reference pixel. For example, for portions such as the cheek that has a high color similarity between pixels, a large patch size may be used. The greater the patch size is, the greater the exactness of forming the map, but the speed may become slower. In the present embodiment, an appropriate patch size may be determined in accordance with the characteristics of an object area.

Furthermore, the map former 130 may compare the key frame and the reference frame, and extract depth information based on the comparison. In this case, only one reference frame may be used, or a plurality of accumulated reference frames may be used.

The depth information of the key frame may be extracted by measuring the color similarity between a key frame pixel x and a reference frame testing pixel x'. For example, the depth information is extracted using a multi-view based approach method, and all of frames close to the key frame are used as reference frames IR. The cost E for all voxels may be calculated using Equation 3 below.

$$E = \Sigma_{I \in I_R}(E_d(I) + \gamma \cdot E_S(I)) + \delta \cdot E_C(I_R) \qquad \text{[Equation 3]}$$

Herein, E is the cost for all voxels, $E_d$ is a data term that measures a photometric error between the key frame and the reference frame, more specifically a difference of color. $E_S$ is a shape error that measures a distance between triangles within M where the voxels and x belong to. Furthermore, ifferenconstant number regarding $E_S$. Furthermore, EC is a term that measures a variance of the reference frame testing pixel x' in the reference image. Furthermore, δ is the constant number of $E_C$.

The content generator 140 may generate a 3D content of an object using the depth map generated in the map former 130 and the plurality of images. In this case, the depth map may be generated for all of input images or for some of the input images. When the depth map is formed for two or more images, the content generator 140 may generate a 3D content by accumulating the depth maps of two or more images.

Particularly, the content generator 140 may determine a volume of the object based on the 3D location information of the extracted feature point, and determine a resolution. More specifically, it is possible to predict an approximate volume of the object using the updated size of the facial model and the average depth information of the depth map regarding the key frame.

Furthermore, the content generator 140 may generate a 3D content based on the measured volume. Therefore, since it is possible to prevent resources from being wasted in areas other than the object, the precision and speed of restoring the shape may be improved.

For example, the content generator 140 may determine a volume of a voxel cube, the volume being equal to or greater than the object.

Then, the content generator 140 may rotate the voxel cube based on the learned model of the object and the content generator 140 may apply different resolution according to parts of the object.

To be specific, the content generator 140 may apply a higher resolution to the predetermined part of the object than to the part other than the predetermined part. For example, when an object is face of a human, the content generator 140 may apply the first resolution to, for example, the parts corresponding to eyes, nose, and mouth, and may apply the second resolution which is lower than the first resolution as for remaining parts.

Figure 3:
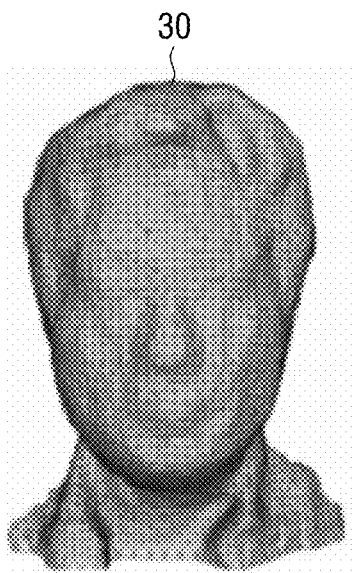
FIG. 3 is a view for explaining a model of which the shape has been restored according to an exemplary embodiment.

The content generator 140 may restore a surface of the object by accumulating the depth maps generated for each key frame. For example, the truncated signed distance function (TSDF) which is a well known technology may be used. Furthermore, the content generator 140 may extract a surface from an accumulated volume using a marching cube algorithm, and generate a watertight model through Poisson mesh optimization, thereby restoring the shape of the object. FIG. 3 illustrates a shape 30 restored according to an exemplary embodiment.

Then, the content generator 140 may generate a 3D content of the object by performing texture reconstruction. Texture restoration refers to coloring the shape restored.

In the case of texture restoring, texture misalignment may occur due to external and internal elements, or a difference of texture color may occur. For example, if the object is a human head, movements such as pupils movement, eye blinking, lip movement and the like may occur during photographing, and therefore, when a texture restoration with respect to a feature point such as an eye and a lip and the like is performed based on a plurality of images, the feature point such as an eye and a lip and the like may appear unnatural.

Therefore, to avoid the above problems, in an exemplary embodiment, the content generator 140 selects one of a plurality of images based on at least one of an arrangement shape of a feature point of the detected face and a capturing location of an image, and restores at least one texture of an eyebrow area, an eye area, a nose area and a mouth area by using the selected image, to generate a 3D content of the object.

Therefore, in an area of the face where movement is likely to occur such as the eyebrow area, eye area, nose area or mouth area, texture restoration is performed using an image in which the feature point is most distinguishable, among a plurality of images, unnatural expression of the face may be prevented from the completed 3D contents.

In this case, the texture of an area defined as the eyebrow area, eye area, nose area or mouth area may be restored based on one image selected as aforementioned, and to provide a more natural texture expression, the texture may be restored based on two or more images. For example, an area close to an edge of the eyebrow area, eye area, nose area or mouth area, one image selected as aforementioned may be combined with another image to perform texture restoration.

With respect to the rest of the areas other than the areas such as the eye area, nose area or mouth area, the content generator 140 may restore texture by selecting at least two images of the plurality of input images and combining the selected images based on at least one of an arrangement shape and determined capturing locations of a detected facial feature point.

More specifically, the content generator 140 may restore texture of the rest of the areas other than the eye area, nose area or mouth area and the like by applying a weighted average to a color obtained from images of the face.

Figure 4:
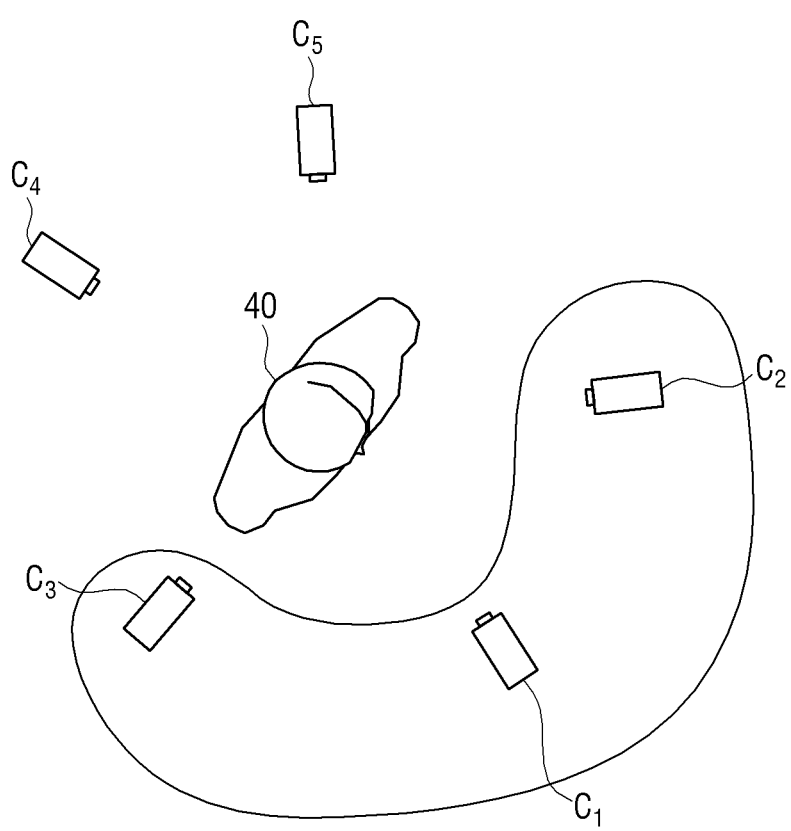
FIGS. 4, 5, 6A, 6B, 6C, 6D, and 6E are views for explaining a texture restoring method according to various exemplary embodiments.

FIG. 4 is a view for explaining a method for restoring texture according to an exemplary embodiment. An object is captured by a camera, which is a head 40 of a person. FIG. 4 illustrates images taken by one camera as the camera turns around the object. In FIG. 4, locations $C_1$, $C_2$, and $C_3$ correspond to locations of the camera that faces a face of the head 40 and is thus visible to the person. Furthermore, locations $C_4$ and $C_5$ correspond to locations of the camera that faces a back of the head 40 and is thus invisible to the person.

The image taken by the camera at location $C_1$ may be an image that represents the face most well, and thus the content generator 140 may select the image taken at location $C_1$, and restore the texture of the eyebrow area, eye area, nose area and mouth area using the selected image. The image captured at location $C_1$ may be called 'the best image' hereinafter.

In this case, the content generator 140 may select the best image by using the following method based on the facial feature point that is detected by applying the facial model by the detector 120.

Figure 5:
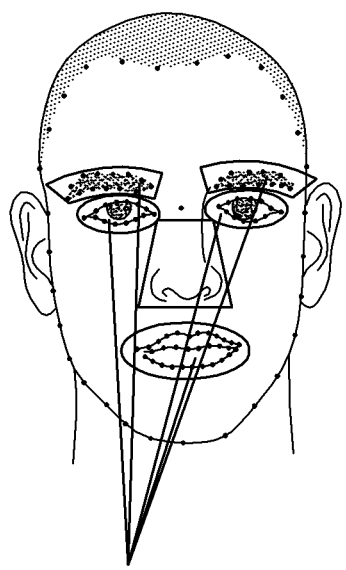

The content generator 140 designates the eyebrow area, eye area, nose area and mouth area of the face as illustrated in FIG. 5 as an unblended area 1 to be restored by using the texture of one image.

Furthermore, the content generator 140 selects an image of which the cost function F defined by Equation 4 below becomes the maximum value.

$$F = a \cdot f_{frontal} + b \cdot f_{eyeOpen} + c \cdot f_{eyeCenter} + d \cdot f_{mouthOpen} + e \cdot f_{facialExpression}$$ [Equation 4]

Figure 6A:
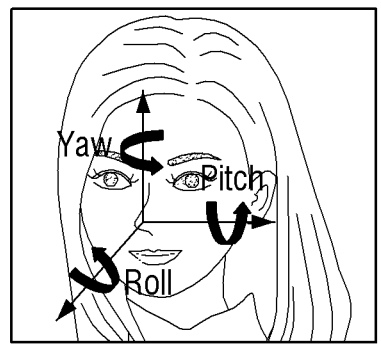
Figure 6B:
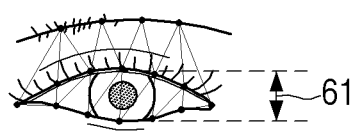
Figure 6C:
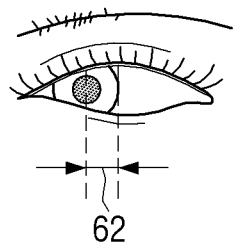
Figure 6D:
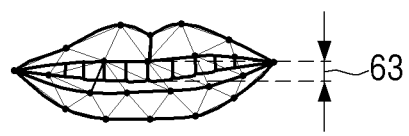
Figure 6E:
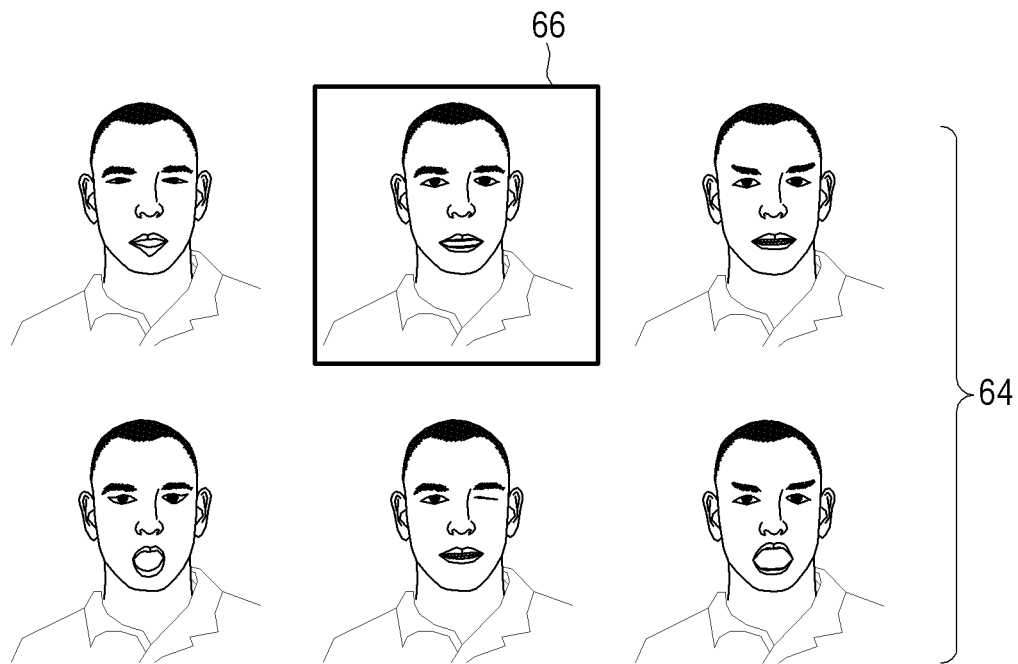

F is the cost function, and referring to FIG. 6A, $f_{frontal}$ is an element regarding a front face direction, and referring to FIG. 6B, $f_{eyeOpen}$ is an element 61 regarding an extent the eye is opened, and referring to FIG. 6C, $f_{eyeCenter}$ is an element 62 regarding a location of a pupil, that is a location of a gaze, and referring to FIG. 6D, $f_{mouthOpen}$ is an element 63 regarding an extent the mouth is opened, and referring to FIG. 6E, $f_{facialExpression}$ is an element 64 regarding a facial expression. The less the face shows emotional expressions, the higher the score of the element 64 is. In FIG. 6E, the score of the element 66 may have a highest score among the plurality of elements 64. Furthermore, each of a, b, c, d, and e may be a weighted value element.

When the object in the image faces toward the front direction, the greater the extent the eye is opened (i.e., the more the eye is opened), the more the pupil is at the middle, and the less the mouth is opened (i.e., the more the mouth is closed), and the less the face shows emotional expression. Based on the above characteristics, the image may be selected as the best image.

In the case of the unblended area toward the front direction, restoration is performed on a texture of the image that is selected as the best image. In the case of an area that is not the unblended area Φ, texture is restored by applying a weighted average to the color obtained from the captured images.

Furthermore, the content generator 140 may further perform an algorithm for a hole filling, and restore a color in an area in a texture map where a color is not allocated.

Various exemplary embodiments described above may be realized in a recording medium that may be read by a computer or a computer-related apparatus using software, hardware or a combination thereof. By using hardware, exemplary embodiments may be realized using at least one function of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions. For example, the functions performed by the aforementioned detector 120, map former 130, content generator 140, and location determiner may be realized by a central processing unit (CPU) and/or a graphic processing unit (GPU) of a 3D original content generating apparatus 100. By using software, exemplary embodiments may be realized by separate software modules. Each of the software modules may perform one or more functions and operations of the exemplary embodiments described above.

Figure 7:
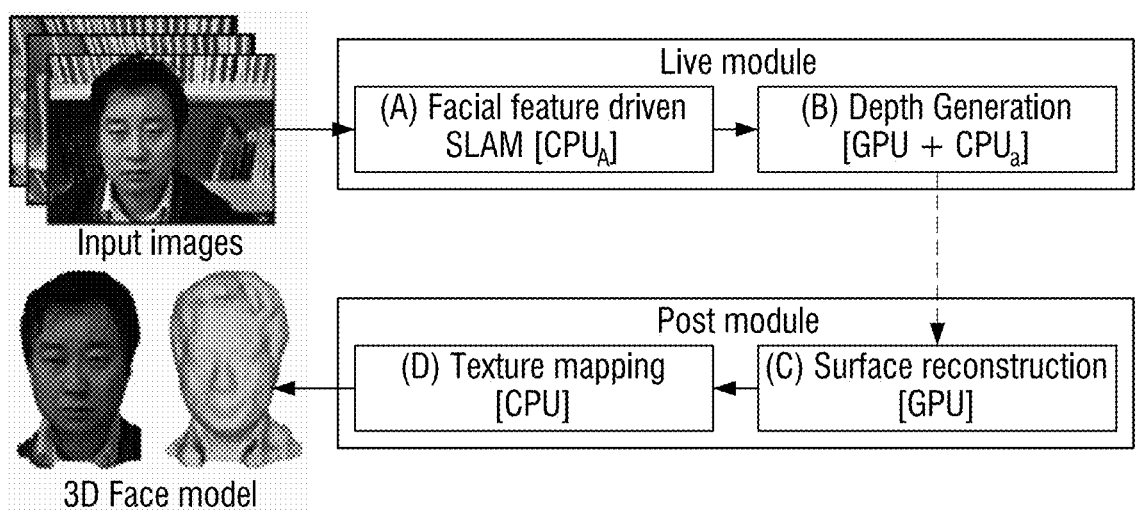
FIG. 7 is a view for explaining a data processing pipeline for 3D modeling of a three dimensional generating apparatus according to an exemplary embodiment.

The functions of the 3D content generating apparatus according to various exemplary embodiments may be largely divided into two modules, which are illustrated in FIG. 7.

FIG. 7 is a view for explaining each pipeline of data processing performed in the content generating apparatus 100 according to an exemplary embodiment.

Referring to FIG. 7, a pipeline includes of two parts: a live-module and a post-module. The live-module performs data processing in real time while a captured image is being input, and performs task A and task B on the input captured image in parallel. The task A includes an operation of detecting the feature points of the face, and the task B includes an operation of forming the depth map based on the detected feature points. Furthermore, the post module includes shape restoration C and texture restoration D that are performed after the photographing is completed.

In the meantime, it has been described as an example that a subject of restoration is a face, but the disclosure of the present application is not limited to the face restoration, and restoration can be performed for any object. Here, an object signifies anything which has a shape.

Figure 8:
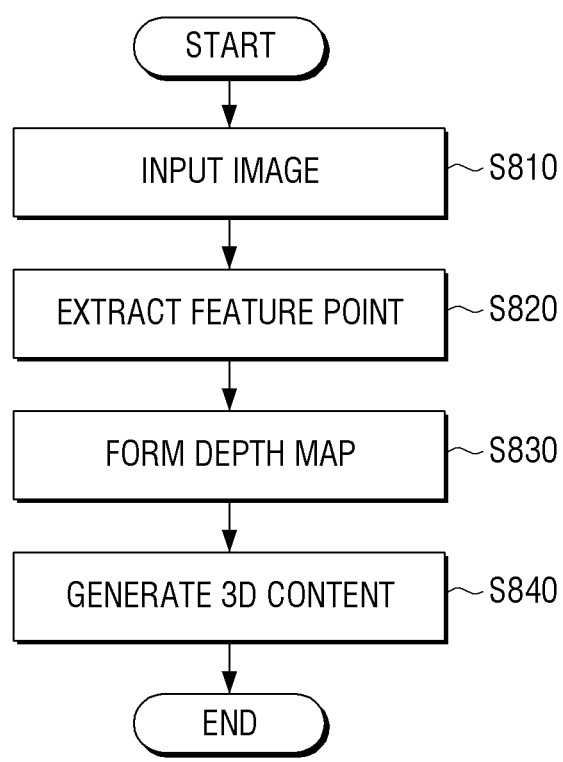
FIG. 8 is a flowchart for explaining a three dimensional content generating method according to an exemplary embodiment.

FIG. 8 is a flowchart for explaining a 3D content generating method according to an exemplary embodiment.

Referring to FIG. 8, the 3D content generating apparatus 100 receives a plurality of images of an object captured in different locations (S810). In this case, each of the plurality of images may be a frame of the object captured in a video format, or a still image captured sequentially. Furthermore, the plurality of images may be simultaneously input, or input one at a time after processing of a previous image is completed. The 3D content generating apparatus 100 may be an apparatus configured to receive an image from an external camera or an apparatus having a camera. In this case, the camera may be a monocular camera.

Furthermore, the 3D content generating apparatus 100 detects a predetermined feature point from each of the plurality of images (S820). To be specific, the 3D content generating apparatus 100 may apply a learned model of the object to each of the plurality of images and detect a feature point of the object. The learned model of the object indicates a result of repeating the operations that a plurality of images (for example, when an object is the face of a human, images photographing various faces of humans) regarding the object are input, preset feature points are selected manually or automatically from each image, and information on the selected feature points is input, with reference to a plurality of images.

In the case where the object is a head of a person, the 3D content generating apparatus 100 may apply a learned facial model to each of the input plurality of images and detect a feature point of the face. In this case, an algorithm of using AAM or ASM may be used. As still another example, when a subject of restoration is hands, the content generating apparatus 100 may detect the feature point of hands from a plurality of input images using learned hand model.

The 3D content generating apparatus 100 may determine a capturing location (i.e. camera pose) of each of the plurality of images based on the 3D location information of the extracted feature point.

The 3D content generating apparatus 100 may update the model of the object using at least one of the detected feature point of the object, the plurality of images and the determined capturing location. That is, a model learning may be updated in real time.

In this case, the updated model of the object may further include position and color information of a 3D point which are additionally generated based on a position, color, and texture information of each of the plurality of input images.

Furthermore, the 3D content generating apparatus 100 may apply the updated model to the image being input after the updating of the model and detect the feature point of the object.

Furthermore, the 3D content generating apparatus 100 may extract 3D location information of the extracted feature point, and form a depth map of a surface of the object based on the 3D location information of the extracted feature point. (S830).

In this case, the 3D content generating apparatus 100 may select an image to extract depth information based on the extracted feature point, and form a depth map based on the depth information extracted from the selected image. Herein, the image to extract depth information may be called a key frame.

More specifically, in the case where the object is a head of a person, relatively a greater number of images which are determined to correspond to a face having a lot of curved areas based on the detected feature point are selected as a key frame, and relatively a smaller number of images which are determined to correspond to the back of a head that rarely has a curved area based on the detected feature point are selected as the key frame. For example, in the case where the number of images to be selected as a key frame is predetermined to a certain number, it is possible to restore the shape more efficiently by allocating the number of key frames according to the areas of the face, according to an exemplary embodiment.

The 3D content generating apparatus 100 may form a depth map through template matching between at least two images of the plurality of images, and may determine a patch size for template matching based on the 3D location information of the feature point extracted from the at least two images.

Furthermore, the 3D content generating apparatus 100 may determine a depth range of a surface of the object based on the 3D location information of the extracted feature point, and form a depth map within the determined depth range.

Then, the 3D content generating apparatus 100 generates a 3D content using the depth map formed and the plurality of images (S840). More specifically, surface reconstruction and texture mapping may be performed.

At the surface reconstruction operation, a volume of the object may be predicted based on the 3D location information of the extracted feature point, and the shape may be restored based on the predicted volume. More specifically, an approximate volume of the object may be predicted using the average depth information of the depth maps of the key frame and the size of the updated model of the object, and a resolution may be determined based on the predicted volume of the object. Therefore, by preventing the resource from being wasted in areas other than the object, the speed and precision of restoring the shape may be improved.

Furthermore, it is possible to accumulate the depth maps of respective key frames, restore the surface by using the accumulated depth maps, and extract the surface from the accumulated volume (e.g., marching cube algorithm) and generate a watertight model (Poisson mesh optimization), thereby extracting the final shape.

Furthermore, at the texture restoration operation, the 3D content generating apparatus 100 may select one of the plurality of images as the best image based on the arrangement shape of the extracted feature point of the object. The best image refers to an image that is determined as representing the object most well.

In the case where the object is a head of a person, the best image refers to an image that is determined as representing the face most well. When the image faces toward the front direction, the greater is the extent the eye is opened, the more the pupil is at the middle, the less the mouth is opened, and the less the face shows emotional expression. Based on the above characteristics, the image may be selected as the best image.

Furthermore, the 3D content generating apparatus 100 may restore texture of at least one predetermined area of the object by using the selected best image.

In addition, for the rest of the areas, the 3D content generating apparatus 100 may select at least two images, from among the plurality of images, based on the at least one of the arrangement shape of the detected feature point and the determined capturing location, and may restore, by using the at least two selected images, a texture of the areas other than the areas of which texture is restored by using the selected best image.

For example, in the case where the object is a head of a person, the 3D content generating apparatus 100 may restore at least one texture of the eyebrow area, eye area, nose area and mouth area by using the selected best image.

In addition, for the rest of the areas, the weighted average is applied to the color of the captured images of the object (or images obtained by the cameras visible to the object) and then applied to the restored shape.

The 3D content generating method described above is only an example and various other exemplary embodiments are possible.

The 3D content generating method according to various exemplary embodiments may be realized as a program that includes an algorithm implementable by a computer, and the program may be stored in a non-transitory computer readable medium.

The non-transitory computer readable medium may be mounted onto various apparatuses.

A non-transitory computer readable medium refers to a computer readable medium that stores data semi-permanently and not for a short period of time such as a register, cache, and memory and the like. More specifically, the programs for performing the various aforementioned methods may be stored in a non-transitory computer readable medium such as a compact disk (CD), a digital versatile disk (DVD), a hard disk, a Blue-ray disk, a universal serial bus (USB), a memory card, a read only memory (ROM) and the like. Accordingly, the program may be installed in a related art apparatus to realize a 3D content generating apparatus that performs 3D content generating operations according to exemplary embodiments.

According to the various exemplary embodiments, it is possible to generate a 3D facial model that may be printed from a mobile at a very fast speed using a monocular camera. Furthermore, it is possible to stably perform 3D modeling in a face that lacks sufficient number of feature points.

Furthermore, since it is possible to complete a SLAM initialization without a burdensome operation of moving the camera, user convenience may be improved. There are difficulties in related SLAM based modeling technologies to specify a facial model by only improving a basic frame based on an algorithm using a photometric error between images. However, the algorithm provided in the exemplary embodiments may resolve the difficulty of facial modeling by combining 3D technologies with 2D recognition and machine learning.

Although a few embodiments have been shown and described, it would be appreciated by those skilled in the art that changes may be made in the example embodiments without departing from the principles and spirit of the disclosure, the scope of which is defined in the claims and their equivalents.

What is claimed is:

1. An electronic apparatus comprising:
   a memory storing instructions;
   a processor configured to execute the stored instructions to:
   obtain a plurality of images of an object,
   obtain at least one feature point of the object from each of the plurality of images and three dimensional (3D) location information of the obtained at least one feature point by using a trained artificial intelligence (AI) model,
   obtain at least one depth map with respect to a surface of the object based on the obtained 3D location information,
   identify a first area of the object for a first texture reconstruction process and a second area of the object for a second texture reconstruction process,
   determine the plurality of capturing locations, from which each of the plurality of images is captured, based on the obtained 3D location information of the feature point, and
   obtain a 3D content of the object based on the plurality of capturing locations, the at least one depth map and at least one image of the plurality of images,
   wherein the processor is configured to identify an image, from among the plurality of images, based on the determined plurality of capturing locations, and is configured to restore, by using the identified image, a texture of at least one predetermined part of the object, to obtain the 3D content.

2. The electronic apparatus according to claim 1, wherein the processor is configured to identify at least two images, from among the plurality of images, based on a distribution of the obtained at least one feature point and the determined plurality of capturing locations, and is configured to restore, by using the at least two identified images, a texture of a part other than the at least one predetermined part, to obtain the 3D content.

3. The electronic apparatus according to claim 1, wherein the processor is configured to:
   obtain the at least one depth map through stereo processing between at least two images among the plurality of images, and
   determine a size of a patch for the stereo processing based on at least one of the 3D location information of the at least one feature point obtained from the at least two images and the plurality of capturing locations from which the at least two images are captured.

4. The electronic apparatus according to claim 1, wherein the processor is configured to determine a depth range with respect to the surface of the object based on the 3D location information of the at least one feature point, and is configured to obtain the at least one depth map based on the determined depth range.

5. The electronic apparatus according to claim 1, wherein the processor is configured to determine a volume of the object based on the 3D location information of the at least one feature point, and is configured to obtain the 3D content based on the determined volume.

6. The electronic apparatus according to claim 1, wherein the plurality of images are obtained by capturing the object by using a monocular camera at the plurality of capturing locations.

7. An electronic apparatus comprising:
a memory storing instructions;
a processor configured to execute the stored instructions to:
obtain a plurality of images of an object,
obtain at least one feature point of the object from each of the plurality of images and three dimensional (3D) location information of the obtained at least one feature point by using a trained artificial intelligence (AI) model,
obtain at least one depth map with respect to a surface of the object based on the obtained 3D location information,
determine the plurality of capturing locations, from which each of the plurality of images is captured, based on the obtained 3D location information of the feature point, and
obtain a 3D content of the object based on the plurality of capturing locations, the at least one depth map and at least one image of the plurality of images
wherein the processor is configured to:
identify an image, from among the plurality of images, based on at least one of a distribution of the obtained at least one feature point and the determined plurality of capturing locations; and
obtain the at least one depth map based on depth information extracted from the identified image, and
the processor is further configured to:
determine a volume of a voxel cube, the volume being equal to or greater than the object;
rotate the voxel cube based on a learned model of the object; and
apply a higher resolution to at least one predetermined part of the object than to a part other than the predetermined part.

8. A method for obtaining a three dimensional (3D) content, the method comprising:
obtaining an input of a plurality of images of an object;
obtaining at least one feature point of the object from each of the plurality of images and 3D location information of the obtained at least one feature point by using a trained artificial intelligence (AI) model;
obtaining at least one depth map with respect to a surface of the object based on the obtained 3D location information of the feature point;
identifying a first area of the object for a first texture reconstruction process and a second area of the object for a second texture reconstruction process;
determining the plurality of capturing locations, from which each of the plurality of images is captured, based on the obtained 3D location information of the feature point; and
obtaining a 3D content of the object based on the determined plurality of capturing locations, the at least one depth map and at least one image of the plurality of images,
wherein the obtaining the 3D content of the object comprises identifying an image, from among the plurality of images, based on the determined plurality of capturing locations, and restoring, by using the identified image, a texture of at least one predetermined part of the object, to obtain the 3D content.

9. The method according to claim 8, wherein the obtaining the 3D content of the object comprises identifying at least two images, from among the plurality of images, based on a distribution of the obtained at least one feature point and the determined plurality of capturing locations, and restoring, by using the at least two selected images, a texture of a part other than the predetermined part.

10. A method for generating a three dimensional (3D) content, the method comprising:
obtaining an input of a plurality of images of an object;
obtaining at least one feature point of the object from each of the plurality of images and 3D location information of the obtained at least one feature point by using a trained artificial intelligence (AI) model;
obtaining at least one depth map with respect to a surface of the object based on the obtained 3D location information of the feature point;
determining the plurality of capturing locations, from which each of the plurality of images is captured, based on the obtained 3D location information of the feature point; and
obtaining a 3D content of the object based on the determined plurality of capturing locations, the at least one depth map and at least one image of the plurality of images,
wherein the obtaining the at least one depth map comprises:
identifying an image, from among the plurality of images, based on at least one of a distribution of the obtained at least one feature point and the determined plurality of capturing locations;
obtaining the at least one depth map based on depth information extracted from the identified image;
obtaining a volume of a voxel cube, the volume being equal to or greater than the object;
rotating the voxel cube based on a learned model of the object; and
applying a higher resolution to at least one predetermined part of the object than to a part other than the predetermined part.

11. The method according to claim 8, wherein the obtaining the at least one depth map comprises obtaining the at least one depth map through stereo processing between at least two images among the plurality of images, and
determining a size of a patch for the stereo processing based on at least one of the 3D location information of the at least one feature point obtained from the at least two images and the plurality of capturing locations from which the at least two images are captured.

12. A non-transitory record medium that stores instructions that, when executed by a computer, causes the computer to:
obtain an input of a plurality of images of an object;
obtain at least one feature point of the object from each of the plurality of images and 3D location information of the obtained at least one feature point by using a trained artificial intelligence (AI) model;

obtain at least one depth map with respect to a surface of the object based on the obtained 3D location information of the feature point;

identify a first area of the object for a first texture reconstruction process and a second area of the object for a second texture reconstruction process;

determine the plurality of capturing locations, from which each of the plurality of images is captured, based on the 3D location information of the feature point; and obtain a 3D content of the object based on the determined plurality of capturing locations, the at least one depth map and at least one image of the plurality of images, wherein the obtaining the 3D content of the object comprises identifying an image, from among the plurality of images, based on the determined plurality of capturing locations, and restoring, by using the identified image, a texture of at least one predetermined part of the object, to obtain the 3D content.

* * * * *